United States Patent [19]

Baker et al.

[11] Patent Number: 4,837,036

[45] Date of Patent: Jun. 6, 1989

[54] LOW FAT THIN-BODIED YOGURT PRODUCT AND METHOD

[75] Inventors: Donald B. Baker, Tulsa; Vanessa Hulett, Jenks, both of Okla.

[73] Assignee: The Pro-Mark Companies, Inc., Tulsa, Okla.

[21] Appl. No.: 106,359

[22] Filed: Oct. 9, 1987

Related U.S. Application Data

[63] Continuation-in-part of Ser. No. 052,988, May 22, 1987.

[51] Int. Cl.$^4$ .................... A23C 9/123; A23C 9/133; A23L 1/236
[52] U.S. Cl. ........................................ 426/43; 426/61; 426/583; 426/588; 426/548
[58] Field of Search ...................... 426/34, 42, 43, 583, 426/522, 588, 548, 658

[56] References Cited

U.S. PATENT DOCUMENTS

| | | |
|---|---|---|
| 3,128,190 | 4/1964 | Donay . |
| 3,269,842 | 8/1966 | Mayer et al. . |
| 3,677,897 | 7/1972 | Jeffreys . |
| 3,897,307 | 7/1975 | Porubcan et al. . |
| 3,932,680 | 1/1976 | Egli et al. . |
| 3,969,534 | 7/1976 | Pavey et al. . |
| 4,096,287 | 6/1978 | Kemp . |
| 4,110,476 | 8/1978 | Rhodes . |
| 4,163,802 | 8/1979 | Redfern et al. . |
| 4,216,243 | 8/1980 | Hermann . |
| 4,258,064 | 3/1981 | Michener, Jr. . |
| 4,410,549 | 10/1983 | Baker . |
| 4,416,905 | 11/1983 | Lundstedt et al. . |
| 4,430,349 | 2/1984 | Malone et al. . |

FOREIGN PATENT DOCUMENTS

809598 2/1959 United Kingdom .
871909 7/1961 United Kingdom .

OTHER PUBLICATIONS

Webb et al., Byproducts From Milk, 2nd Ed., The Ari Publishing Co., Inc., Westport, Conn. 1975 (pp. 38–40).
Kosikowski, Cheese and Fermented Milk Foods, Ithaca, NY, 1977 (68–89).

*Primary Examiner*—Marianne Cintins
*Attorney, Agent, or Firm*—Sixbey, Friedman, Leedom & Ferguson

[57] ABSTRACT

A low calorie, low fat, high total solids, high protein content, thin-bodied, fruit-containing yogurt product is prepared by a process including the steps of admixing a butterfat-containing milk product in sufficient amount to provide a butterfat content in the yogurt product of less than about 0.5% by weight, limited quantities of a stabilizer mix, a nutritive sweetener, and non-heat modified nonfat dry milk solids and processing the mixture by homogenizing, vat pasteurizing, fermenting with a uniquely proportioned three component bacterial yogurt culture mixture consisting essentially of, by weight, 15–25% *Lactobacillus acidophilus*, 30–50% *Lactobacillus bulgaricus* and 30–50% *Streptococcus thermophilus*, blending with low caloric, nutritive sweetener-containing fruit preserves and cooling. The resultant fruited yogurt product has a total solids content of 21.9 to 23.9%, a protein content of at least 4.5%, a caloric content of 150 calories per 6 ounce (170 gram) serving; the body, texture and taste of conventional thin-bodied fruit-containing yogurt; is resistant to syneresis; and exhibits a consumer acceptable appearance characterized by the absence of free moisture on the product surface and within the packaging therefor.

40 Claims, No Drawings

LOW FAT THIN-BODIED YOGURT PRODUCT AND METHOD

CROSS-REFERENCE TO RELATED APPLICATIONS

This is a continuation-in-part of pending application U.S. Ser. No. 052,988, filed May 22, 1987 for Improved Low Fat Yogurt Product and Method.

BACKGROUND OF THE INVENTION

1. Field of the Invention

The present invention relates generally to a method for making a fruit-containing yogurt product and, more specifically, to a method for making a low fat, low calorie fruit-containing yogurt product having the appearance, texture and taste of conventional thin-bodied fruit-containing yogurt.

2. Description of the Prior Art

Yogurt is, conventionally, a cultured milk product produced by fermenting sources of butterfat, such as milk, skim milk, cream, nonfat milk solids, and the like, in liquid or powder form, with a yogurt culture producing lactic acid. Depending upon the butterfat source employed, other ingredients and the processing treatment, yogurt may be prepared in various forms. Frozen yogurt, at one extreme, is generally consumed in hard frozen or soft serve form. Liquid yogurt, at the other extreme, is consumed by drinking as contrasted with by use of a spoon. The most common or so-called conventional form of yogurt is firm bodied, smooth and viscous, generally having the consistency of a light gel which is pudding or custard-like and spoonable. What has now become known as European style yogurt is a thin-bidied version of conventional yogurt, having a viscosity of 2 to 10 cm, preferably 4 to 8 cm, but not as thin as liquid yogurt, and not drinkable. Fruit-filled yogurts are made Sundae style with fruit on the bottom, Swiss style with the fruit pre-mixed, or Western style with the fruit on the bottom and the yogurt colored and/or flavored. Most plain yogurt (unfruited) on the market contains from 120 to 150 calories per 8 ounce (227 grams) serving. Most fruited yogurts contain 240 to 270 calories per 8 ounce (227 gram) serving. Milk product bases for yogurt, depending on taste, display varying butterfat contents and yogurts may be prepared with fat contents varying from as low as less than 0.4 percent by weight up to about 20 percent. According to FDA labeling standards, yougurt may be labeled as "nonfat" if it contains 0.4% or less butterfat; as "lowfat" if it contains from 0.5% to 2% butterfat; and as fullfat or regular yogurt if it contains at least 3.25% butterfat. Most commercially available yogurts are "lowfat" by FDA labeling standards.

In recent years yogurt has enjoyed immense popularity. The beneficial effects on health due to the therapeutic properties of the bacterial cultures contained in yogurt are well known. In addition, yogurt has become a popular food among dieters. To increase its appeal, the sharp, tangy taste characteristic of plain, unflavored yogurt, which heretofore made yogurt unacceptable to many people, has been masked in many yogurt products with fruit and sweeteners. This practice has resulted in a flavored yogurt product that is more palatable to a wider segment of the population. However, the use of these additives has been accompanied by an increase in product calorie content from the about 120 to 150 calories per eight ounce (227 grams) serving of plain, unflavored yogurt to about 240 to 270 calories per eight ounce (227 grams) serving of the sweetened, fruit-containing yogurt. Such a high calorie content renders the fruited product generally unsuitable for inclusion in reducing diets since the fruit yogurt uses up the majority of the calories usually alloted to a single meal. As a result the dieter has difficulty choosing a sufficient variety or quantity of foods to form a balanced meal within the remaining calories allowed. Accordingly there has existed for some time a need for a fruit-containing yogurt product which is low in calories, fat and carbohydrate content.

There have been efforts, none of them totally successful, at producing a sweetened or flavored yogurt product with a relatively low butterfat content but which exhibits the characteristic creamy consistency and desirable flavor, appearance and mouth feel of conventional full-bodied custard or pudding-type yogurt products while, at the same time, overcoming the high calorie and high carbohydrate problems accompanying the use of fruited or flavored yogurt. One very important reason for the apparent inability to achieve this goal is that yogurt made from really low fat milk products, e.g., less than about 0.5% butterfat, is typically loose and watery and lacking in flavor, rather than creamy and with consumer acceptable flavor, appearance, body and mouth feel. Moreover, yogurt having such an undesirably thin consistency does not blend well with fruit additions and, therefore, the fruit additions do not meaningfully add to the attractiveness and palatability of the yogurt product. Efforts to overcome this problem to obtain a palatable product have either required adding flavor influencing milk solids, which increases the yogurt calorie and carbohydrate contents, or increasing the butterfat content, which has a similar effect. It will, therefore, be appreciated that in the production of fruited yogurt, acceptable solutions to taste and diet problems appear to adversely affect appearance, body and mouth feel characteristics, and vice-versa. Accordingly, it is not at all surprising that, to date, no fully acceptable low fat, low calorie, fruited yogurt product has become available.

The problems associated with preparing a consumer acceptable low fat, low calorie, fruited yogurt become even more difficult when the yogurt product sought to be produced is the so-called European style yogurt. Due to localized destabilization of the yogurt, thin-bodied yogurt products tend to whey off more readily, resulting in separation of the moisture and the curd. Free whey or moisture accumulates around the edges of the yogurt cup and covers all or part of the product surface. The result is an unattractive product which is unappealing to consumers. In the context of a thin-bodied, low fat yogurt product, where the use of relatively large amounts of stabilizers to absorb water and prevent whey leakage is not a viable approach due to the undesirable thickening or body-creating effect of such stabilizers and where the emulsifying capacity of butterfat is effectively non-existent, wheying off is a difficult problem to deal with.

To be sure there have been serious efforts at producing fruited yogurt products having at least some of the foregoing desirable attributes—i.e., low fat, low calorie, thin-bodied, and consumer acceptable appearance, body, texture and mouth feel. For example, in U.S. Pat. No. 3,969,354, Pavey et al teach the production of a fruited, flavored yogurt which has a relatively low, not exceeding about 0.5% by weight, butterfat content. However, the Pavey method requires post-culturing heat treatment and homogenization to achieve whey separation, extensive curd coagulation, and product restructuring. As a result, the appearance, body and mouth feel of the Pavey yogurt will be demonstrably distinguishable from a product not so treated. Moreover, the Pavey process does not purport to produce a thin-bodied product and makes no effort to control or minimize the calorie content of its resulting yogurt product in order to produce a product which is below the 240 to 270 calories/8 ounce serving calorie content of conventional fruited yogurt products. In U.S. Pat. No. 3,128,190, Donay discloses the use of a skim milk starting material. However, the process for making Donay's fruit-containing yogurt requires fruit which is precooked with sucrose to prevent fermentation thereof by the yogurt cultures with resultant unpleasant flavors. As a result of this procedure the Donay et al method neither produces really low fat yogurt nor reduces the high calorie and carbohydrate content of conventional fruit-containing yogurts. Moreover, the Donay product has a semi-solid consistency similar to ice cream and quite clearly does not prepare a thin-bodied yogurt product. In U.S. Pat. No. 4,110,476, Rhodes discloses a process for preparing liquid or frozen, rather than thin-bodied custard-type, yogurt products which utilize whey protein concentrate together with milk products as the starting material ingredients and contain higher sugar contents than are desirable for a fruit-containing yogurt product suitable for a reducing diet. According to Rhodes, the whey protein concentrate allows the preparation of a liquid or frozen yogurt by preventing wheying off, curd formation and casein precipitation. In U.S. Pat. No. 3,269,842, the fruited yogurt product produced by the Mayer et al process has a fat content of about 4% and appears to be an undesirably high calorie, high carbohydrate product.

Probably the most ambitious effort at producing a consumer acceptable low fat, low calorie, low carbohydrate yogurt product is disclosed in U.S. Pat. No. 4,410,549—Baker wherein a low calorie, low fat, fruit-containing yogurt is prepared by a process including the steps of admixing skim milk, stabilizers and heat modified nonfat dry milk solids, and processing the mixture by heating, homogenizing, fermenting with a culture mixture of *Lactobacillus acidophilus, Lactobacillus bulgaricus* and *Streptococcus thermophilus,* blending with low calorie fruit preserves and cooling. The heat modified nonfat dry milk solids are derived from a process in which condensed skim milk is subjected to non-coagulative direct steam heating prior to spray drying. Notwithstanding that the resultant yogurt product had the consistency, texture and taste of conventional firm-bodied custard or pudding type, and not of thin-bodied, fruit-containing yogurt, the packaged product nevertheless exhibited puddling, i.e., it released free moisture which accumulated around the edge of the yogurt cup and covered all or part of the product surface. This departure from the conventional and consumer-anticipated appearance of yogurt is an undesirable aspect of the product of the Baker process.

It is, therefore, apparent that despite the numerous efforts to produce a satisfactory, low fat consumer acceptable yogurt product, there still exists a need for such a product and, in particular, for a low fat, fruit-containing yogurt which is low in calories while resembling conventional thin-bodied yogurt in appearance, texture, body and taste.

SUMMARY OF THE INVENTION

In accordance with one broad aspect of the present invention, there is provided a fruit-containing yogurt product which resembles thin-bodied conventional yogurt in appearance, texture and taste, but which has a fat and calorie content significantly below that of conventional yogurt products.

In accordance with another aspect of the present invention, there is provided a fruit-containing, spoonable, thin-bodied custard or pudding-type yogurt product which is nutritionally equivalent to an average serving of milk and fruit, but is sufficiently low in fat, carbohydrate and calories to be included as a desirable component of a reducing diet.

In accordance with still another aspect of the present invention, there is provided a nutritious, palatable, fruit-containing yogurt product which has the creamy mouth feel and the sweet, fruity, slightly tangy taste of conventional spoonable, thin-bodied custard or pudding-type yogurt but which has a butterfat content below about 0.5% by weight of the final product and a calorie content of about 150 calories/6 ounce (170 gram) serving.

In yet another aspect of the present invention there is provided a method for making a very low fat, low calorie, fruit-containing, spoonable, thin-bodied custard or pudding-type yogurt product which resembles conventional thin-bodied yogurt in appearance, texture, body and taste, such method including the steps of forming a yogurt base by admixing a butterfat-containing milk product, e.g., pasteurized skim milk, in sufficient amount to provide a butterfat content in said yogurt product of less than about 0.5%, preferably less than about 0.2% and, most desirably, less than about 0.1%, with reduced amounts of suitable stabilizers, non-heat modified nonfat dry milk solids in an amount sufficient to provide a total solids content of 21.9 to 23.9% by weight in the fruited yogurt product. and a nutritive sweetener, preferably, sucrose and optionally with a high butterfat (BF) content cream (e.g., 38% BF); optionally adding vitamin and mineral fortification, other sweeteners, flavorants and/or colorants; homogenizing the mixture under conventional elevated pressure conditions at 500 to 5000 psig (35.15 to 351.5 kg/cm$^2$), desirably 1000 to 2000 psig (70.03 to 140.06 kg/cm$^2$) and preferably at 1000 to 1200 psig (70.03 to 84.36 kg/cm$^2$); heating the mixture with constant agitation to about 190° to 195° F. (87.7° to 90.6° C.) for about 20 to 60 minutes; and adding optional heat labile vitamins, such as Vitamin C. The homogenized mixture is cooled to about 90° to 120° F. (32.2° to 48.9° C.), preferably 96° to 110° F. (35.5° to 43.3° C.), and inoculated with a uniquely proportioned blend of standard yogurt cultures.

In one preferred aspect of the invention, the inoculated mixture is maintained at the inoculation temperature until the desired taste and custard body are achieved, which is usually at a pH of about 4.3 to 4.9 preferably 4.5 to 4.7. The yogurt is then cooled to about 50° to 75° F. (10° to 23.9° C.), preferably 65° to 70° F. (18.3° to 21.1° C.), and pumped through a small orifice, such as an in-line screen, to break up small pieces of coagulant which are present and to produce a smooth, continuous mass, all as is well known in the art. Low calorie, low carbohydrate fruit preserves are thoroughly blended into the custard, and the resulting product is packaged in suitable individual containers and refrigerated at temperatures sufficiently low to stop fermentation, generally 35° to 50° F. (1.7° to 10° C.), and preferably about 38° F. (3.3° C.). The resulting thin-bodied, low calorie, low fat product, has a smooth, thin but creamy texture and slightly tangy fruit flavor, and contains pieces of fruit suspended throughout.

DETAILED DESCRIPTION OF THE INVENTION

The present invention relates broadly to a fruit-containing yogurt product which is nonfat by FDA labeling standards and resembles conventional thin-bodied, custard-type, fruit-containing yogurt in appearance, texture and taste, but which has fat and calorie contents substantially reduced below those of conventional thin-bodied low fat fruited yogurt. As a result, the yogurt made by the method of the present invention is suitable for inclusion in the diets of persons for whom a reduced intake of fat or calories is necessary or desirable. In its preferred form, the low calorie, low fat, thin-bodied custard-type, fruit-containing yogurt product of the present invention comprises a major amount of pasteurized, homogenized cultured skim milk and minor amounts of nutritive sweeteners, low calorie fruit preserves and stabilizers. Vitamins, minerals and flavorants are optional. Most importantly, the product of the present invention has a total fat content by weight of less than about 0.5%, preferably less than about 0.2%, a total carbohydrate content not exceeding about 29 grams per 6 ounce (170 gram) serving, a protein content of about 9 grams per 6 ounce (170 gram) serving—about 5.3% by weight, and contributes only about 150 calories per 6 ounce (170 gram) serving to the diet. Desirably, the finished product has a pH in the range 4.0 to 4.5, preferably 4.1 to 4.4, and ideally about 4.25, a total solids content of about 21.9% to 22.9%, preferably 22.4%, a protein content of not less than about 4.5%, preferably about 5 to 6%, and contains about 12% to 20%, preferably 12% to 15%, and, most desirably, about 15% by weight fruit.

The process by which the fruit-containing yogurt product of the present invention is made involves forming a yogurt base by admixing, preferably at a slightly elevated temperature of about 100° F. (37.8° C.), a butterfat-containing milk product, e.g., pasteurized skim milk, in sufficient amount to provide a butterfat content in the yogurt product of less than about 0.5% by weight, stabilizers, a nutritive sweetener, preferably sucrose, non-heat modified nonfat dry milk solids and, optionally, high butterfat content (e.g., 38% BF) cream; optionally adding vitamins and minerals, other sweeteners, flavorants and/or colorants to the admixture; homogenizing the resulting mixture by conventional homogenization means; heating the resulting mixture to a temperature of about 190° F. to 195° F. (87.7° to 90.6° C.) to vat pasteurize; and, adding optional heat labile vitamins, such as Vitamin C. The mixture is then cooled to a temperature of about 90° to 120° F. (32.2° to 48.9° C.), preferably 96° to 110° F. (35.5° to 43.3° C.) and inoculated with a uniquely proportioned blend of standard lactic acid producing yogurt cultures. The inoculated mixture is maintained at this temperature in the bulk mixing vat until the desired taste and texture are achieved, then cooled to about 50° to 75° F. (10° to 23.9° C.), pumped through a screen, screw or pressure valve and admixed with fruit preserves prior to packaging and refrigeration (Swiss style).

In order to prepare a yogurt product having a fat content not greater than about 0.5% by weight the use of fat contributing ingredients must be carefully controlled. Inasmuch as the primary fat contributing ingredient in yogurt is generally milk, a low fat content may readily be achieved by selecting a skim milk with a butterfat content of less than abut 0.4% by weight, and preferably less than about 0.2% by weight, or an equivalent composition, as described hereinbelow, for use as the starting material in the process of the present invention. The term "milk" as used herein means the conventional milk of commerce (butterfat content ranging from about 0.1% to 3.5% by weight) as well as equivalent compositions formed by suitable admixtures of butterfat-containing milk products and/or milk solids and water.

The primary carbohydrate containing ingredients in yogurt are nutritive sweeteners which, in accordance with the present invention, are added both to the yogurt base mix, i.e., the butterfat-containing milk product-stabilizer-nonfat milk solids mix which is inoculated and cultured, and to the fruit component. Quite surprisingly it has been found that this split or two-part nutritive sweetener addition provides an enhanced sweetening and flavoring effect compared to making a single addition, either to the base mix or the fruit component, for any given amount of sweetener added. Although the reason for this enhanced sweetening effect is not completely understood it is believed that the presence of large amounts of sugar suppresses, at least in part, the lactic acid fermentation. As a result, not only do sugars remain because they are not converted to lactic acid, but also, there is less tart lactic acid to influence the yogurt flavor. The result is a sweeter yogurt notwithstanding that no extra sweetener has been added. By thus achieving a higher sweetening effect without adding extra sweetener the amount of sweetener used in the preparation of the instant fruit-containing yogurt can be regulated and the carbohydrate content of the yogurt product can be minimized. Using this technique, the carbohydrate content of the fruited yogurt product of the present invention can be limited to as low as 21–22 grams per 6 ounce (170 gram) serving, which is significantly less than the 32 to 35 grams of carbohydrate per 8 ounce (227 gram) serving of conventional fruited yogurt.

Typically, the fruit added to yogurt resembles fruit preserves having discrete pieces of fruit or whole berries in a thickened sugar syrup. Fruit in this form effectively masks the flavor of the yogurt with a predominantly sweet, fruity taste and is less likely to be fermented by the yogurt bacteria. The process of the present invention provides a low fat, low calorie, fruit-containing yogurt product by utilizing fruit which has been prepared to resemble the preserves heretofore used in conventional yogurt, but which is low in calorie content and which contains only a portion of the nutritive sweeteners added during the process. If desired, particularly where the economics are favorable, the fruit component may contain, in addition to conventional disaccharide sugars, monosaccharide sugars having high sweetening effects. For example, the syrup for the fruit pieces can be advantageously prepared using a combination of fructose and sucrose as the sweetener, with the sucrose comprising from 40 to 100% by weight of the sweetener, balance fructose. It is particularly desirable from a taste standpoint for the sweetener employed to be 100% sucrose. However, a fructose-containing fruit component sweetener which has been found to be very satisfactory comprises about 60% sucrose and 40% fructose, by weight. A preferred fruit preserve preparation which has been found to achieve the desired results contains 40% to 50% by weight fruit pieces or whole berries cooked in a syrup made from a suitable sweetener containing at least 40% sucrose and thickened with pectin. The resulting preserves contain about 41% to 47% solids, are at the normal pH for the specific fruit used, and contain not more than 825 to 1000 calories per pound (1815 to 2000 calories per kg), preferably 1000 calories per pound (2200 calories per kg) of preserves. Any of the fruits and berries commonly used in conventional fruit-containing yogurt products, such as strawberries, blueberries, cherries and the like, may be prepared for use in the product of the present invention.

The combination of a low level of sweetener and a low level of fat results in a yogurt product having significantly fewer calories than prior products. In this connection, because the sweetener level of the fruit-containing yogurt product of the present invention is so very carefully controlled by carefully limiting the timing and quantity of sweetener additions, the pH level of the fruit component should be carefully controlled to the range 4.1 to 4.3 by the addition, where necessary, of a pH adjuster such as citric acid or sodium citrate. Controlled fruit component pH is very important in a yogurt product such as this, which does not contain excess sweetners to overcome the flavor influencing effects of excess fruit acidity or alkalinity.

To prepare the low calorie fruit-containing yogurt of the present invention, in a preferred embodiment, pasteurized skim milk having a fat content of less than about 0.5% by weight, preferably less than about 0.2% by weight, and most desirable less than about 0.1% by weight, is placed in a stainless steel mixing vat or like container and may be heated, if desired, to about 100° F. (37.8° C.) to facilitate its admixture with the other ingredients. The skim milk may be fluid milk from which the butterfat has been substantially removed, or may be reconstituted skim milk made from milk solids and water or from a combination of butterfat-containing milk products, milk solids and water. Optionally, high butterfat containing cream (e.g., 38% BF) may be added in amounts ranging from 0 to 1% by weight of the yogurt base. The milk component may have been pasteurized by any conventional means, although it is preferred to use skim milk which has been pasteurized by the high temperature, short time (HTST) method. To complete the yogurt base, to the skim milk are added stabilizers, sugar and non-heat modified nonfat dry milk solids.

The preferred stabilizers include a carefully proportioned mix of modified food starch, pectin, and gelatin in limited quantities, e.g., not exceeding about 0.75% by weight of the yogurt base, preferably 0.5 to 0.75%, to improve the body and texture without undesirable thickening and gelling and to prevent syneresis, particularly during long term storage. The modified food starch contributes to the custard-like, smooth body and texture of the thin-bodied yogurt product. The gelatin, which preferably has a Bloom index of 225, and the pectin function primarily to bind water and prevent syneresis. Desirably, the three component stabilizer mix consists essentially of the modified starch in an amount of 50 to 75% by weight of the stabilizer mix, balance the pectin and gelatin components in approximately equal proportions. Most desirably, the pectin and gelatin contents are such that the absolute value of the difference between their contents, expressed in percent by weight of the stabilizer mix, does not exceed 10%. A particularly preferred stabilizer mix consists essentially of 55% modified food starch, 20% pectin and 25% gelatin. To some tastes a more natural, less artificially thickened, thin-bodied yogurt product can be made by omitting the modified food starch. In such a case the gelatin and pectin stabilizer mix desirably contains 70 to 80% by weight gelatin, balance pectin. Other commonly used commercially available dairy stabilizers could also be utilized, either alone or in combination.

The non-heat modified nonfat dry milk solids generally comprise about 4.6 to 5.4% by weight of the yogurt base, the amount of milk solids being based in part on the solids content of the skim milk and in part on the desire to increase the protein content of the yogurt product, as is more fully explained hereinafter. In order to achieve the low fat and low calorie levels of the yogurt of the present invention yet provide a thin-bodied custard-type product having a creamy consumer acceptable appearance in the yogurt cup, rather than a wet product having free moisture around the edges of the cup and covering the yogurt surface, as in prior low fat, low calorie yogurt products, the dry milk solids should be of the non-heat modified type. This is a very surprising observation since, in the past, it has been believed that specially heat modified nonfat dry milk solids were the ingredients of choice for developing acceptable texture, body and mouth feel in low butterfat-containing milk products. See, for example, U.S. Pat. No. 4,410,549. However, in the preparation of the thin-bodied, fruited yogurt product of the present invention, which utilizes a uniquely proportioned three-component bacterial culture mix, it is believed that there is an adverse interaction between the elongated protein micelles of the heat modified nonfat milk solids and at least one of the yogurt culture strains which results in undesirable puddling within the cup. By contrast, it has been found that non-heat modified or so-called conventional nonfat dry milk solids interact with one or more of the culture strains to create body and aid congealing of the milk. As is well known, the conventional or non-heat modified nonfat milk solids have been available for decades and are made by pasteurizing fresh skim milk (less than 0.4% butterfat) by high temperature short time (HTST) techniques and then spray drying the pasteurized skim milk. Thus, as used herein, the terms conventional or non-heat modified nonfat milk solids refer to milk solids which have been subjected to no heat treatment prior to spray drying other than pasteurization. By contrast, heat modified nonfat milk solids, as is well known, are milk solids which have been subjected to pre-spray drying heat treatment techniques which alter their properties. Exemplary of such milk solids are those prepared according to the process disclosed in U.S. Pat. No. 4,096,287—Kemp which teaches the step of non-coagulative direct steam heating of condensed skim milk prior to spray drying.

The nonfat milk solids are also an important protein-contributing component to the thin-bodied yogurt product of the present invention. As hereinbefore discussed, providing a thin-bodied yogurt product which has consumer acceptable body and texture presents a difficult problem since conventional body-affecting additives, such as stabilizers, have an undesirable thickening effect which is unacceptable in the preparation of a thin-bodied yogurt. Therefore, in accordance with the present invention consumer acceptable body and texture is imparted to the yogurt product by use of only very limited quantities of carefully selected stablizers, as hereinbefore described, as well as carefully selecting and proportioning the bacterial cultures and employing a relatively high total solids content, 15.6 to 17.6%, preferably about 16.6%, by weight in the yogurt base and 21.9 to 22.9%, preferably 22.4%, by weight, in the fruited yogurt product. By comparison, for example, a conventional full-bodied yogurt product typically has a total solids content of about 12% by weight in the yogurt base and 17.5% in the fruited yogurt product. Although the use of a higher total solids content in preparing a less viscous, thin-bodied product may appear to be somewhat contradictory, it has been found that the higher solids content allows the use of additional nonfat milk solids (for example 4.6 to 5.4% by weight of the yogurt base by comparison with a corresponding 2 to 3.5% by weight in a typical conventional full-bodied yogurt product). The additional milk solids contribute additional high quality protein which are acted upon by the culture-produced acids to improve the desired body and texture of the final product without undue thickening.

It has been found convenient to premix the stabilizers and nonfat dry milk solids in the amounts normally used for production so that nonfat dry milk solids serve as a carrier for the stabilizers. In this connection, as previously indicated, it is acceptable to use admixtures of nonfat dry milk solids, with or without butterfat-containing milk products, and water in lieu of skim milk in the process of the present invention. It is also acceptable to use limited quantities of high butterfat cream in the yogurt base. Therefore, when preparing the yogurt base, the selection of starting ingredients must be consistent with the desired 15.6 to 17.6%, preferably about 16.6% by weight, total solids in the yogurt base and the 21.9 to 22.9% by weight, preferably about 22.4% by weight, total solids in the final fruited product.

It may in some instances be desirable to fortify the fruit-containing yogurt product of the present invention with vitamins and minerals so that a six ounce (170 gram) serving is nutritionally equivalent to a single serving of milk, which is usually eight ounces (227 gram), and a single serving of fruit, which varies according to the kind of fruit. Such fortification, while not essential to the present invention, results in a product of greater nutritional value than a non-fortified product and facilitates the intake of the recommended daily allowances of these vitamins and minerals. Heat labile vitamins and minerals, such as Vitamin C, which are destroyed by prolonged high temperatures, should not be added at this stage of the process, but are preferably added at a later time after high temperature heating has taken place.

At this stage in the process it may be desirable to add a sweetener, flavor enhancer or colorant. Addition of one or any combination of these ingredient materials produces a yogurt custard that is sweet, flavored and/or colored without the fruit being stirred therethrough. Alternatively, these ingredients may be added later in the process, for example with the fruit. Any sweetener used should not, in combination with the sweetener added to the base mix and the sweetened fruit, exceed the desired carbohydrate level of the product. In this connection, the sweeteners employed at any point in this process are nutritive sweeteners, such as the well known mono- and disaccharides. However, other well known nutritive sweeteners, such as aspartame, may be employed provided their use in yogurt products is permitted. Any one of a number of commercially available and well known flavor enhancers and/or certified food grade colorings may also be used.

The skim milk-stabilizer-nonfat dry milk solids-sugar mixture, comprising the yogurt base, which may optionally contain vitamins, minerals, sweeteners, flavorants and/or colorants, optionally may be pasteurized at this stage by high temperature, short time (HTST) techniques. The pasteurized or unpasteurized mixture is then homogenized by conventional homogenization means at about 500–5000 psig (35.15 to 351.5 kg/cm$^2$), desirably 1000 to 2000 psig (70.03 to 140.06 kg/cm$^2$), and preferably 1000 to 1200 psig (70.03 to 84.36 kg/cm$^2$), after which it is heated to a temperature in the range from about 190° to 195° F. (87.7° to 90.6° C.) for a time sufficient to form a uniform, substantially homogeneous mixture and to vat pasteurize the mixture, usually about 20–60 minutes. Heat treating at this high temperature denatures the milk protein, causing water in the mixture to be absorbed and helps to create a thicker, richer product having a custard-type body and texture. The heat labile vitamins and minerals, such as Vitamin C, if used, may be added once the heat treatment at 190°–195° F. (87.7° to 90.6° C.) is complete and the mixture has cooled below the temperature at which the particular vitamin and/or mineral might be adversely affected. The mixture is cooled to an optimum culturing temperature, generally in the range of 90° to 120° F. (32.2° to 48.9° C.) and preferably 96°–110° F. (35.5° to 43.3° C.) in preparation for bacterial inoculation, although the temperature may vary slightly according to the bacterial culture or cultures used.

The pasteurized, homogenized mixture is inoculated with a uniquely proportioned blend of lactic acid producing bacterial cultures commonly used in yogurt production in order to confer upon the final yogurt product the proper combination of acidity, tartness and body appropriate for a thin-bodied custard-type yogurt product. Preferred as constituents of the customized yogurt culture for use in the process of the present invention are *Lactobacillus bulgaricus, Streptococcus thermophilus* and *Lactobacillus acidophilus*. It has been found that when all three of these bacterial cultures are simultaneously employed in predetermined proportions, even very low fat milk-containing mixtures can be cultured to achieve the important thin-bodied custard-type creamy body and mouth feel of conventional thin-bodied yogurt while, at the same time, achieving the desired tartness and acidity. This cannot be successfully achieved with other than all three bacterial cultures employed in the following proportions by weight:

*Lactobacillus acidophilus:* 15–25%
*Lactobacillus bulgaricus:* 30–50%
- *Streptococcus thermophilus:* 30–50%

It had heretofore been believed that in preparing a low fat yogurt product, the proper combination of cultures was generally determined by the amount of *Lactobacillus acidophilus* required to culture the low fat milk mixture to a stringy, rubbery (sometimes termed "ropy") body texture which yields an acceptable yogurt-like, custard-type, creamy mouth feel. The *Lactobacillus bulgaricus* and *Streptococcus thermophilus*, the traditional yogurt cultures, generally comprised the balance of the culture in about equal proportions. It was also believed that in preparing a thin-bodied, low fat yogurt product, in which stabilizers were most desirably omitted, or their proportion significantly reduced, acceptable body and texture could be obtained by a marked increase in the *acidophilus* proportion of the culture mix, to make up for omitted stabilizer, with a corresponding decrease in the *bulgaricus* and *thermophilus* proportions. Quite surprisingly, this is not the case. In fact, it has been noted, at one extreme, that the use of an exclusively *acidophilus* culture, with no stabilizer, resulted in a yogurt product with a thickness similar to pourable liquid and which had an enhanced tendency to whey off. As a result, it has been determined that in order to achieve the optimum body, texture and mouth feel in the desired low fat, thin-bodied yogurt product while, at the same time, interacting most advantageously with the non-heat modified nonfat milk solids to provide a product having consumer acceptable appearance, particularly characterized by the absence of free moisture within the yogurt cup, the bacterial culture blends useful in the present invention includes less, not more, *Lactobacillus acidophilus*. In accordance with the present invention, a particularly desirable bacterial culture mix has the following proportions by weight of the three culture strains: 20% *Lactobacillus acidophilus*, 40% *Lactobacillus bulgaricus* and 40% *Streptococcus thermophilus*.

It will, therefore, be appreciated that the use of a uniquely proportioned culture mix, as set forth hereinabove, is of primary importance in preparing the low fat, low calorie, thin-bodied yogurt product of the present invention. In addition, the effectiveness and synergistic interaction of the hereindescribed three component bacterial culture mix in combination with the relatively large amount of high quality protein available by virtue of the additional non-heat modified nonfat milk solids used to achieve the high total solids content of the present yogurt product produces a low fat, low calorie, fruited, thin-bodied yogurt product which is extremely resistant to synersis and which exhibits both consumer acceptable appearance and the organoleptic characteristics, i.e., body, texture and mouth feel, of conventional thin-bodied, but higher fat content, yogurt products.

To this point in the process there has been no significant difference in processing between the preparation of yogurt which has a predominantly fruity flavor and contains pieces of fruit uniformly dispersed throughout the yogurt custard, and the preparation of other styles of fruited or flavored yogurt. The primary differences in processing the various types of yogurt are such considerations as whether the yogurt is cultured in the bulk mixing vat before packaging or in the individual packaging containers and whether the yogurt is on the bottom of the container or dispersed throughout the yogurt custard. The present invention is described in terms of the latter yogurt style, it being well known in the art, see for example, U.S. Pat. No. 4,410,549, how to produce other styles of yogurt.

The cultured mixture is maintained at about 110° F. (43.3° C.) until a yogurt custard with an acceptable thin-body and taste is produced. Although taste and texture are highly subjective and will vary from producer to producer, experience has shown that when the product reaches a pH in the range of about 4.3 to 4.9, preferably about 4.5 to 4.7, which typically takes about two to four hours, an acceptably firm but thin-bodied yogurt custard with a pleasantly sharp, tangy taste has been produced. When an accetpable product from the standpoint of taste and texture has been produced, the yogurt is cooled to about 50° to 75° F. (10° to 23.9° C.), preferably about 65° to 70° F. (18.3° to 21.1° C.), to slow the fermentation while maintaining a sufficiently fluid mixture so that it can be readily pumped through a screen. The cooled mixture is then pumped through an in-line screen to achieve a smooth texture. Fruit preserves are thoroughly blended into the yogurt custard, desirably to achieve a level of about 12% to 20% by weight fruit in the final product, preferably at a level of 15% fruit and 85% yogurt base. The resulting product is packaged in conventional yogurt containers, e.g., 6 ounce (170 gram) containers, and held at conventional refrigeration temperatures, about 35° to 40° F. (1.7° to 4.4° C.), to fully terminate fermentation. When maintained under conventional refrigeration temperatures, the product has a shelf life of about 45 days.

The following examples illustrate the practice of the present invention and are intended to exemplify and not to limit in any respect the content and scope thereof.

EXAMPLE I

A low calorie, low fat thin-bodied yogurt was prepared in the following manner:

2319.5 pounds (1053.1 kg) of HTST pasteurized skim milk (containing 9.0% solids and less than 0.1% by weight butterfat) was placed in a stainless steel culturing vat equipped with an agitator. To this milk was added 20.6 pounds (9.4 kg) of 38% BF cream, 17.9 pounds (8.1 kg) of a premixed stabilizer mixture which contained modified food starch, pectin, and gelatin (Bloom index 225), about 123.2 pounds (55.9 kg) of non-heat modified nonfat dry milk solids and 68.9 pounds (31.3 kg) of granulated sugar (sucrose). The resulting mixture was thoroughly blended, homogenized at 1000 to 1200 psig. (70.03 to 84.36 kg/cm$^2$) and vat pasteurized at 190° to 195° F. (87.7° to 90.6° C.) for 30 minutes. The homogenized and pasteurized mixture was then cooled to about 100° F. (37.8° C.), inoculated with 70 ml of 20:40:40 mixture, by weight, of *Lactobacillus acidophilus, Lactobacillus bulgaricus* and *Streptococcus thermophilus* cultures and maintained in the vat at this temperature until the mixture reached a pH of about 4.5 to 4.6 and had an acceptable custard consistency. The yogurt was cooled to about 65° to 70° F. (18.3° to 21.1° C.) and then pumped through an in-line screen to give it a smoother texture. Four hundred and fifty pounds (204.3 kg) of sucrose-containing preserves having less than 1000 calories per pound (2200 calories per kg) were mixed into 2550 pounds (1157.7 kg) of the yogurt custard. The resulting low calorie, low fat yogurt had a desirable, thin body (a viscosity of about 6 cm), smooth, creamy texture, contained blueberries uniformly mixed throughout, was the color of blueberries mixed with cream and had a predominantly sweet blueberry taste in combination with a slightly sharp and tangy yogurt taste. The product was packaged in conventional six ounce yogurt cups, contained 150 calories, 0.34% by weight fat, about 5.3% by weight protein and 22.9% by weight total solids per six ounce (170 gram) serving, and remained stable for about 45 days at 35° to 40° F. (1.7° to 4.4° C.).

EXAMPLE II

A low calorie, low fat thin bodied yogurt was prepared in the same manner as in Example I except that the 38% BF cream was omitted and 143.8 pounds (65.4 kg) of nonfat dry milk solids were used in preparing the yogurt base. The resulting thin-bodied yogurt product was in all respects comparable to the Example I product.

EXAMPLE III

A low calorie, low fat thin-bodied yogurt was prepared in the very same manner as in Example I except that 1849 pounds (839.4 kg) of less than 0.1% BF, 9% solids skim milk, 97 pounds (44.0 kg) of non-heat modified nonfat dry milk solids, 54 pounds (24.5 kg) of sucrose and 15 pounds (6.8 kg) of a stabilizer mix consisting of Bloom index 225 gelatin, modified food starch and pectin were admixed to form the yogurt base. No cream was added. The resulting thin-bodied yogurt product was in all respects comparable to the Example I product.

It is also possible, using substantially the same ingredients and procedures, to prepare an unfruited, low calorie, low fat thin-bodied yogurt product which is very well suited for use by dieters. The plain yogurt product, although very low in fat and calories, exhibits the desirable organoleptic properties of conventional thin-bodied yogurts does not whey off and does not exhibit unacceptable moisture accumulation in the yogurt cup. Most desirably, the plain yogurt product has a butterfat content less than abut 0.2% by weight, a calorie content of about 90 calories per 6 ounce (170 gram) serving, a total solids content, as a result of the absence of added nutritive sweeteners, in the range 13 to 17 percent by weight and a protein content of 9 to 10 percent by weight.

EXAMPLE IV

An unfruited yogurt product was made in the same manner as the yogurt base of Example I by admixing 1700 pounds (772.7 kg) of HTST pasteurized skim milk (containing 9.0% solids and less than 0.1% by weight butterfat), 17.8 pounds (8.1 kg) of the premixed stabilizer mixture and 80.0 pounds (36.4 kg) of non-heat modified nonfat dry milk solids. No nutritive sweetener was added. The resulting low calorie, low fat thin-bodied plain yogurt was packaged in conventional six ounce yogurt cups, contained 90 calories, less than 0.1% fat, about 5.3% by weight protein and 13.95% by weight total solids.

We claim:

1. A method for making a low butterfat, low calorie, high total solids, high protein content, thin-bodied yogurt product containing fruit, said method comprising the steps of:
    (a) admixing a butterfat-containing milk product in sufficient amount to provide a butterfat content in said yogurt product of less than about 0.5% by weight, at least one stabilizer, a first nutritive sweetener, and non-heat modified nonfat dry milk solids for forming a yogurt base, said nonfat dry milk solids being present in an amount effective to improve texture and body, to maintain the total solids level in said fruited yogurt product in the range 21.9 to 23.9% by weight and to provide, together with said milk product, a protein content of at least 4.5% in said fruited yogurt product;
    (b) homogenizing said yogurt base at pressures in the range 500 to 5000 psig (35.15 to 351.5 kg/cm²);
    (c) heating said yogurt base to a temperature in the range from about 190° to 195° F. (87.7° to 90.6° C.) for a time sufficient to form a uniform, substantially homogeneous mixture and to effect pasteurization;
    (d) cooling said homogenized base to a temperature of about 90° to 120° F. (32.3° to 48.9° C.);
    (e) inoculating said cooled, homogenized base with a lactic acid producing bacterial yogurt culture mixture consisting essentially of, by weight, 15–25% *Lactobacillus acidophilus*, balance *Lactobacillus bulgaricus* and *Streptococcus thermophilus* in approximately equal proportions;
    (f) maintaining said inoculated base at a temperature of about 90° to 120° F. (32.2° to 48.9° C.) for a time sufficient to produce a pH in the range of about 4.3 to 4.9 for forming an acceptable taste and texture in said inoculated yogurt base;
    (g) blending said inoculated base with low calorie fruit preserves, said low calorie fruit preserves comprising a second nutritive sweetener and containing not more than 1000 calories per pound (2200 calories per kilogram) thereof; and
    (h) cooling said blend of fruit preserves and smooth textured product to a temperature sufficiently low to stop fermentation.

2. A method, as claimed in claim 1, wherein said inoculated base is cooled to a temperature in the range 50° to 75° F. (10° to 23.9° C.) and formed into a smooth textured product prior to blending with said preserves.

3. A method, as claimed in claim 1, wherein said milk product comprises skim milk having a fat content of less than about 0.2% by weight.

4. A method, as claimed in claim 3, wherein said skim milk has a fat content of less than about 0.1% by weight.

5. A method, as claimed in claim 1 or 3, wherein said yogurt base comprises by weight of said base, from 0 to 1% of a high butterfat-containing cream.

6. A method, as claimed in claim 5, wherein said cream is 38% butterfat-containing cream.

7. A method, as claimed in claim 1 or 3, wherein sufficient nonfat dry milk solids are added to said yogurt base to provide a total solids content of 15.6 to 17.6% in said yogurt base.

8. A method, as claimed in claim 1 or 3, wherein sufficient nonfat dry milk solids are added to said yogurt base that said nonfat dry milk solids comprise from 4.6 to 5.4% by weight of said yogurt base.

9. A method, as claimed in claim 1 or 3, wherein the amount of stabilizer admixed into said yogurt base is less than 0.75% by weight of said base.

10. A method, as claimed in claim 9, wherein the amount of stabilizer admixed into said yogurt base is from 0.50 to 0.75% by weight of said base.

11. A method, as claimed in claim 1 or 3, wherein sufficient nonfat dry milk solids are added to said yogurt base to provide a total solids content of 21.9 to 22.9% in said fruited yogurt product.

12. A method, as claimed in claim 11, wherein said nonfat dry milk solids comprise from 4.6 to 5.4% by weight of said yogurt base.

13. A method, as claimed in claim 12, wherein the amount of stabilizer admixed into said yogurt base is less than 0.75% by weight of said base.

14. A method, as claimed in claim 1 or 3, wherein said culture mixture consists essentially of, by weight, 20% *Lactobacillus acidophilus*, 40% *Lactobacillus bulgaricus* and 40% *Streptococcus thermophilus*.

15. A method, as claimed in claim 8, wherein said culture mixture consists essentially of, by weight, 20% *Lactobacillus acidophilus*, 40% *Lactobacillus bulgaricus* and 40% *Streptococcus thermophilus*.

16. A method, as claimed in claim 1 or 3, wherein said first and second nutritive sweeteners are selected from the group consisting of monosaccharides, disaccharides, and mixtures thereof.

17. A method, as claimed in claim 1 or 3, wherein said first nutritive sweetener comprises aspartame.

18. A method, as claimed in claim 1 or 3, wherein said second nutritive sweetener, comprises aspartame.

19. A method, as claimed in claim 1 or 3, wherein said first nutritive sweetener is sucrose.

20. A method, as claimed in claim 1 or 3, wherein said second nutritive sweetener comprises from 40 to 100% sucrose.

21. A method, as claimed in claim 7, wherein said second nutritive sweetener comprises fructose.

22. A method, as claimed in claim 1 or 3, wherein said bacterial yogurt culture mixture consists essentially of, by weight, 20% *Lactobacillus acidophilus*, 40% *Lactobacillus bulgaricus* and 40% *Streptococcus thermophilus*.

23. A method, as claimed in claim 1 or 3, wherein said low calorie fruit preserves comprise about 40% to 50% by weight of fruit and a syrup for said fruit.

24. A method, as claimed in claim 23, wherein said fruit preserves are admixed with said inoculated base in an amount sufficient to provide a fruit content in said yogurt product in an amount from 12 to 20% by weight.

25. A method, as claimed in claim 24, wherein said fruit content in said yogurt product is about 15% by weight.

26. A method, as claimed in claim 1 or 3, wherein the pH of said fruit preserves is adjusted to the range 4.1 to 4.3 prior to admixture with the inoculated base.

27. A method, as claimed in claim 1 or 3, comprising the step of high temperature, short time pasteurizing of said base prior to homogenizing.

28. A method, as claimed in claim 1 or 3, wherein said time sufficient in step (b) is from about 20 to 60 minutes.

29. A method, as claimed in claim 1 or 3, wherein said homogenizing pressure in in the range 1000 to 2000 psig (70.03 to 140.06 kg/cm²).

30. A method, as claimed in claim 1 or 3, wherein said temperature sufficiently low to stop fermentation is in the range from 35° to about 50° F. (1.7° to 10° C.).

31. In a method for making a less than about 0.5% by weight fat, low calorie, thin-bodied yogurt product containing fruit, comprising the steps of admixing a butterfat-containing milk product in sufficient amount to provide said fat content in said product, at least one stabilizer, a nutritive sweetener and nonfat dry milk solids, homogenizing said mixture at pressures in the range 500 to 5000 psig (35.15 to 351.5 kg/cm²), heating said mixture to a temperature in the range from about 190° to 195° F. (87.7° to 90.6° C.), cooling said homogenized mixture to a temperature of about 90° to 120° F. (32.2° to 48.9° C.), inoculating said cooled homogenized mixture with a lactic acid producing bacterial yogurt culture mixture, maintaining said inoculated mixture at a temperature of about 90° to 120° F. (32.2° to 48.9° C.) for a time sufficient to produce a pH in the range of about 4.3 to 4.9 for forming an acceptable taste and texture in said inoculated mixture and combining said inoculated mixture with low calorie fruit preserves, the improvement comprising:

said nonfat dry milk solids being of the non-heat modified type and present in an amount effective to maintain the total solids level in said fruited yogurt product in the range 21.9 to 23.9% by weight and to provide, together with said milk product, a protein content of at least 4.5% in said fruited yogurt product, and said lactic acid producing bacterial yogurt culture mixture consisting essentially of, by weight, 15–25% *Lactobacillus acidophilus*, balance *Lactobacillus bulgaricus* and *Streptococcus thermophilus* in approximately equal proportions.

32. A method, as claimed in claim 31, wherein said culture mixture consists essentially of, by weight, 20% *Lactobacillus acidophilus*, 40% *Lactobacillus bulgaricus* and 40% *Streptococcus thermophilus*.

33. A method, as claimed in claim 32, wherein sufficient nonfat dry milk solids are added to said yogurt base to provide a total solids content of 21.9 to 22.9% in said fruited yogurt product.

34. A method, as claimed in claim 33, wherein sufficient nonfat dry milk solids are added to said yogurt base that said nonfat dry milk solids comprise from 4.6 to 5.4% by weight of said yogurt base.

35. A method, as claimed in claim 34, wherein the amount of stabilizer admixed into said yogurt base is less than 0.75% by weight of said base.

36. The product of the process of claim 1.
37. The product of the process of claim 3.
38. The product of the process of claim 13.
39. The product of the process of claim 31.
40. The product of the process of claim 35.

* * * * *